United States Patent [19]

Minamoto et al.

[11] Patent Number: 4,808,443
[45] Date of Patent: Feb. 28, 1989

[54] AQUEOUS OVERCOATING COMPOSITION AND USE OF THE SAME IN PRINTING METHOD

[75] Inventors: Masaya Minamoto, Osaka; Mitsuru Kojima, Hyogo; Toshiharu Sagara, Hyogo; Yorio Takeda, Hyogo, all of Japan

[73] Assignee: Sakata Shokai, Ltd., Osaka, Japan

[21] Appl. No.: 78,024

[22] Filed: Jul. 24, 1987

Related U.S. Application Data

[62] Division of Ser. No. 683,192, Dec. 18, 1984, abandoned.

[30] Foreign Application Priority Data

Dec. 28, 1983 [JP] Japan ................................ 58-249596

[51] Int. Cl.$^4$ .............................................. B05D 1/36
[52] U.S. Cl. ............................. 427/407.1; 101/450.1; 101/463.1; 427/409; 427/411
[58] Field of Search .......................... 101/463.1, 450.1; 427/411, 409, 407.1

[56] References Cited

U.S. PATENT DOCUMENTS

| | | | |
|---|---|---|---|
| 1,669,416 | 5/1928 | Huebner | 101/456 |
| 3,032,521 | 5/1962 | Sanderson | 524/376 |
| 3,085,907 | 4/1963 | Zdanowski et al. | 524/376 |
| 3,106,486 | 10/1963 | Harren et al. | 524/376 |
| 3,368,483 | 2/1968 | Storms | 101/457 |
| 3,790,520 | 2/1974 | Ludwig | 524/376 |
| 4,097,438 | 6/1978 | Christenson et al. | 260/29.4 UA |
| 4,100,125 | 7/1978 | Pezzuto | 260/29.6 TA |
| 4,111,878 | 9/1978 | Ruhf | 524/376 |
| 4,124,555 | 11/1978 | Gross et al. | 260/29.6 HN |
| 4,136,075 | 1/1979 | Finn et al. | 524/376 |
| 4,153,592 | 5/1979 | Burroway et al. | 524/376 |
| 4,172,064 | 8/1977 | Keeler | 260/29.6 TA |
| 4,187,204 | 2/1980 | Howard | 524/376 |
| 4,190,569 | 2/1980 | Kroker et al. | 524/376 |
| 4,230,609 | 10/1980 | Burroway et al. | 524/376 |
| 4,299,752 | 11/1981 | Armour | 524/376 |
| 4,340,648 | 7/1982 | Conrady et al. | 524/376 |
| 4,363,893 | 12/1982 | Hersh | 524/376 |

FOREIGN PATENT DOCUMENTS

| | | | |
|---|---|---|---|
| 0712214 | 6/1965 | Canada | 524/376 |
| 0067312 | 12/1982 | European Pat. Off. | 524/376 |
| 1187641 | 2/1965 | Fed. Rep. of Germany | 101/466 |
| 0066940 | 5/1980 | Japan | 524/376 |
| 0115471 | 9/1980 | Japan | 524/376 |
| 6088463 | 7/1981 | Japan | 524/376 |
| 0071965 | 4/1983 | Japan | 524/376 |
| 0204058 | 11/1983 | Japan | 524/376 |
| 3112429 | 9/1982 | Netherlands | 524/376 |
| 17418 | 2/1963 | United Kingdom . | |
| 953456 | 3/1964 | United Kingdom . | |
| 970792 | 9/1964 | United Kingdom . | |
| 1080220 | 8/1967 | United Kingdom . | |
| 1114133 | 5/1968 | United Kingdom | 524/376 |
| 1223343 | 2/1971 | United Kingdom | 524/376 |
| 1333467 | 10/1973 | United Kingdom . | |
| 1447223 | 8/1976 | United Kingdom | 524/376 |
| 2037792 | 7/1980 | United Kingdom . | |

*Primary Examiner*—Joseph L. Schofer
*Assistant Examiner*—J. M. Reddick
*Attorney, Agent, or Firm*—Wenderoth, Lind & Ponack

[57] ABSTRACT

An aqueous overcoating composition which is able to adhere strongly to an oil-based ink printed on a sheet, enhances the film properties of the oil-based ink as to, for example, gloss, rub resistance and the like, prevents offset and blocking occurring at the time of stacking and the like after printing, and strikingly improves setting and drying of the oil-based ink so that it is possible to start the ensuing work of the after-treatments of printed matter. The composition is coated in a thin film on a wet sheet surface just printed with an oil-based ink, on a printing press or in a printing operation.

10 Claims, 1 Drawing Sheet

AQUEOUS OVERCOATING COMPOSITION AND USE OF THE SAME IN PRINTING METHOD

This application is a division of now abandoned application Ser. No. 683,192, filed Dec. 18, 1984.

BACKGROUND OF THE INVENTION

1. Field of the Invention

This invention relates to an aqueous overcoating composition for coating on a printed surface and a printing method using said composition. More particularly, the present invention provides an aqueous overcoating composition which is coated in a thin film on a wet surface just printed with an oil-based ink and is capable of preventing offset, blocking, etc. and further capable of accelerating the setting of the oil-based ink and improving the workability of the after-treatments of printed matter, as well as a printing method using said composition.

2. Description of Prior Art

Oil-based inks have been and are currently used in lithographic printing, letterpress printing, etc. For example, oil-based inks for sheet-fed lithographic printing which contain, as main binders, a resin, a drying oil and a mineral oil are dried mainly on the basis of oxidative polymerization. The details of the drying mechanism of these oil-based inks will be as follows. That is, when an oil-based ink is printed on a paper, part of the mineral oil and the drying oil contained in the ink infiltrates into the paper and a semi-drying film of the ink is formed on the paper (this phenomenon is called "setting"). Then, the drying oil reacts with oxygen causing oxidative polymerization and curing, whereby complete drying is attained. In ordinary oil-based inks, setting will usually require 15 to 30 min and complete drying will usually require 3 to 10 hr. Thus, setting and drying of the above oil-based inks requires a very long time which impedes printing speed or workability of the after-treatment of the printed matter and this has posed a big problem.

In a sheet-fed lithographic printing, a fine powder such as starch (this powder is referred to as a spray powder) is sprayed on each printed surface right after printing for prevention of offset or breaking caused by piling of the printed sheets, or after each printed sheet is put onto a rack for drying.

In this method, the fine powder scatters, flies into the air and becomes suspended therein, thus posing a problem of environmental hygiene and moreover the fine powder adhered to the printed surface reduces the gloss and other qualities of the printed matter.

In addition, even if the spray powder is used, printed sheets right after printing cannot be piled to the extent desired, cannot be subjected to after-treatments such as cutting, holding and the like, and need to be allowed to stand for several hours for the after-treatments.

On the other hand, web-fed printing, a non-dried ink printed on the web adheres to the machine parts of a printing press such as a guide roller, a tension roller, a folding machine and the like and the adhered ink on the machine parts re-adheres and stains the printed matter or, at the time of rewinding a printed web into a roll or binding a folded printed matter, causes offset or blocking, which makes high speed web printing impossible. For the web printing, therefore, heat-set type inks have been used widely. These inks are rapidly dried by evaporation of the solvents in the inks when the printed surface is heated around 130° C. with a large scale drier such as a burner, an infrared heater, hot air or the like. This drying method causes various problems such as (a) a large amount of energy such as electricity or the like is required, (b) a solvent-containing vapor is discharged leading to air pollution and offensive odor and (c) it is difficult to obtain printed matter which meets gloss and other requirements. Radiation curable inks which are cured rapidly by exposure with an activated ray such as ultraviolet etc. are also used for the web printing. In the use of the radiation curing inks, there are also problems such as (a) a special printing plate, a special blanket and a special ink cleaner are required because the radiation curing inks are composed of different binders from that of a conventional ink and (b) the ink used is not only expensive but also poor in storability, stability and workability and therefore these inks are not widely used.

There has recently been developed a printing method in which a film of an aqueous coating agent is formed on a wet surface right after printing to improve the above mentioned problems associated with drying of printing ink and also to impart various properties such as gloss to the surface. According to this coating method, when the oil-based inks are coated with a conventional aqueous coating agent when still in the wet state on the paper, the aforementioned disadvantages such as offset, blocking and the like which are caused by piling of the printed matter or by reason of other causes can be prevented to a certain extent.

On the other hand, the aqueous coating agent displays no effect for accelerating setting and/or drying of the oil-based ink. Accordingly, after-treatments of the printed matter still cannot be done in several hours. In addition, the above aqueous coating agent, when coated in an oil-based ink in a wet state, has problems of providing inadequate adhesivity or of failing to provide the gloss or rub resistance required for high quality printed matter.

SUMMARY OF THE INVENTION

It is an object of the invention to provide an aqueous overcoating composition which is able to adhere strongly to an oil-based ink printed on a sheet, enhance the film properties of the oil-based ink as to, for example, gloss, rub resistance and the like, prevent offset and blocking occuring at the time of stacking and the like after printing, and strikingly improve setting and drying of the oil-based ink so that it is possible to start the ensuing work of the after-treatments of printed matter.

It is another object of the invention to enable the use in a printing method of an aqueous overcoating composition capable of forming a film at the ambient temperature of a printing operation or heat drying operation wherein the composition is coated in a thin film on a wet sheet surface just printed with an oil-based ink, on a printing press or in a printing operation.

Other objects and advantages of the present invention may become apparent to those skilled in the art from the following description and figures.

DESCRIPTION OF THE PREFERRED EMBODIMENT

Figure 1:
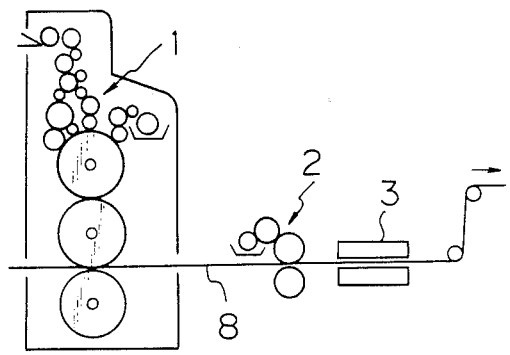
FIG. 1 shows an embodiment of the present invention wherein a coating apparatus is arranged after the final printing unit of a conventional printing press.

The present invention provides an aqueous overcoating composition for coating on an oil-based ink printed on a sheet but still being in a wet state, said composition being comprised of (a) an aqueous dispersion of a resin composed mainly of an acrylic copolymer and (b) 1% by weight or more (based on said composition) of at least one compound selected from the group consisting of:

a (poly)alkylene glycol dialkyl ether represented by the general formula (I)

$$R_1-O+X_1)_n R_2 \qquad (I)$$

(wherein $R_1$ and $R_2$ each are an alkyl group of 1 to 4 carbon atoms, $X_1$ is an oxyalkylene group of 2 to 4 carbon atoms and n is an integer of 1 to 4), an alkylene glycol monoalkyl ether represented by the general formula (II)

$$R_3-O-X_2-H \qquad (II)$$

(wherein $R_3$ is an alkyl group of 4 to 11 carbon atoms and $X_2$ is an oxyalkylene group of 2 to 8 carbon atoms), an alkylene glycol monoester represented by the general formula (III)

$$R_4-COO-X_2-H \qquad (III)$$

(wherein $R_4$ is an alkyl group of 3 to 11 carbon atoms and $X_2$ has the same definition as given above), an alkylene glycol ether ester represented by the general formula (IV)

$$R_5-COO-X_2-R_6 \qquad (IV)$$

(wherein $R_5$ and $R_6$ each are an alkyl group of 1 to 11 carbon atoms, however, when $R_5$ is an alkyl group of 1 to 2 carbon atoms, $R_6$ cannot be an alkyl group of 1 to 3 carbon atoms, and $X_2$ has the same definition as given above), and a dialkyl ester of a dicarboxylic acid represented by the general formula (V)

$$R_7OOC-X_3-COOR_8 \qquad (V)$$

(wherein $R_7$ and $R_8$ each are an alkyl group of 1 to 8 carbon atoms and $X_3$ is a residue of an aliphatic or aromatic dicarboxylic acid), and being capable of forming a film at the ambient temperature of a printing operation or heating-drying operation.

The present invention further provides a printing method using the above aqueous overcoating composition.

Hereinunder, the aqueous overcoating composition of the present invention will be described in more detail.

The aqueous overcoating composition of the present invention is required to be able to form a film at the ambient temperature of a printing operation or heating-drying operation, preferably at 80° C. or lower, more preferably at room temperature. If the film formation temperature is higher than 80° C., a large energy for film formation with a heating apparatus having a heating capacity close to that of conventional drying apparatuses is required. If the film formation temperature is 80° C. or lower, the film formation energy can be relatively small and a simple heating apparatus can be used and therefore such an aqueous overcoating composition is preferable in terms of the object of the present invention. An aqueous overcoating composition capable of forming a film at room temperature is more preferable because no special energy need be applied for film formation.

In order to obtain an aqueous overcoating composition having an intended film formation temperature, it is necessary to control the film formation temperature of the aqueous resin dispersion which is the main component of the aqueous overcoating composition. The film formation temperature of the aqueous resin dispersion can be control by, in its production by emulsion polymerization of polymerizable monomers, considering the glass transition temperature (Tg) of a homopolymer produced from a polymerizable monomer and selecting the ratio of the polymerizable monomer with respect to the other polymerizable monomers in the copolymer obtained. Thereby, an aqueous resin dispersion capable of forming a continuous film at an intended temperature can be produced.

As acrylic monomers usable in the production of the aqueous resin dispersion, there can be mentioned the following compounds. Firstly, as acrylic monomers, there can be mentioned the acrylic acid esters and methacrylic acid esters both represented by the general formula (VI)

$$CH_2=C-COOR_{10} \qquad [VI]$$
$$\quad | \quad$$
$$\quad R_9$$

(wherein $R_9$ is a hydrogen atom or a methyl group and $R_{10}$ is a straight or branched aliphatic hydrocarbon group of 1 to 18 carbon atoms or an alicyclic hydrocarbon group). $R_{10}$ of the general formula (VI) include those containing (1) a straight aliphatic hydrocarbon group such as methyl, ethyl, n-propyl, n-butyl, n-hexyl, n-heptyl, n-octyl, n-nonyl, n-decyl, n-lauryl, n-dodecyl, n-tetradecyl, n-octadecyl or the like, (2) a branched aliphatic hydrocarbon group such as isopropyl, sec-butyl, tert-butyl, 2-ethylbutyl, 2-ethylhexyl, 3,5,5-trimethylhexyl, diisopropylmethyl, 1-methyl-4-ethyloctyl, trimethylnonyl or the like and (3) an alicyclic hydrocarbon group such as cyclohexyl or the like.

As other polymerizable monomers, there can be also mentioned styrene, α-methylstyrene and the like. Among aforementioned polymerizable monomers, there can be mentioned, for example, methyl methacrylate, ethyl methacrylate as well as styrene as monomers capable of providing homopolymers having relatively high Tg.

These polymerizable monomers can be used alone or in a mixture of two or more.

When a polymerizable monomer mixture containing at least 15% by weight, preferably 20 to 50% by weight (based on total polymerizable monomers) of an ester of acrylic acid or methacrylic acid containing an aliphatic or alicyclic hydrocarbon group of 6 to 18 carbon atoms is emulsion-polymerized to produce an aqueous resin dispersion, the dispersion shows an effect which accelerates the setting of oil-based inks. Since this is one object of the present invention, such an ester is therefore particularly preferable. However, when the above particular ester is used in an amount of less than 15% by weight based on total polymerizable monomers, the resulting dispersion shows no acceleration effect on the setting of oil-based inks. With respect to the above particular ester, when it contains an alicyclic hydrocarbon group of 6 to 18 carbon atoms, the resulting dispersion shows the highest acceleration effect on setting, etc. and, when the particular ester contains a branched aliphatic hydrocarbon group of 6 to 18 carbon atoms, the resulting dispersion shows a higher acceleration effect on setting, etc. than when the ester contains a straight aliphatic hydrocarbon group of 6 to 18 carbon atoms.

In the production of an aqueous resion dispersion, in addition to the above mentioned polymerizable monomers, there may also be used other polymerizable monomers, for example, acrylic monomers having a functional group such as unsaturated carboxylic acids (e.g. acrylic acid and methacrylic acid). However, when these monomers having a functional group are used, there are cases wherein poor stable aqueous resion dispersion can be produced and, even if such a dispersion is produced, the water-resistance, chemicals-resistance, etc. of the film formed by the dispersion are lowered. Therefore, it is required that the dispersion has an acid value of 50 or less. When the dispersion has an acid value higher than 50, the film formability of the dispersion as well as the water-resistance and dryability of the film produced from the dispersion are reduced. Hence, the amount used of an acrylic monomer having a functional group must be determined depending upon the application purpose of the aqueous overcoating composition of the present invention.

The aqueous resin dispersion can be obtained by emulsion-polymerizing the above mentioned monomers in accordance with the generally known method by the use of a hydrophilic catalyst such as ammonium persulfate, potassium persulfate, hydrogen peroxide or the like or a Rhedox catalyst. At this time, an emulsifier such as anionic or nonionic surfactant may be added as necessary. In general, the use of a low molecular surfactant tends to lower the water-resistance, chemicals-resistance, etc of a film produced. Therefore, when water-resistance is particularly required for a film produced, the use of a high molecular anionic surfactant is preferred.

The aqueous resin dispersion of the present invention can possess superior properties by using a high molecular anionic emulsifier. As such a high molecular anionic emulsifier, there can be mentioned, for example, an aqueous alkali solution of shellac, an acrylic acid type copolymer, a maleic acid type copolymer or the like which contains carboxylic group in its molecule. As previously described, an aqueous resion dispersion can be ordinarily obtained by controlling a required film formation temperature for the dispersion and producing a copolymer resin so as to satisfy the temperature requirement. Furthermore, the dispersion can also be obtained by separately preparing a dispersion containing a copolymer having a relatively high Tg and a dispersion containing a polymer having a relatively low Tg and blending these two or more dispersions.

Together with the aqueous resion dispersion, there are used, in the aqueous overcoating composition of the present invention, the compounds represented by the following general formulas (I) to (V). It is required that these compounds be used in an amount of 1% by weight or more, preferably 1 to 8% by weight, more preferably 3 to 5% by weight based on the total amount of aqueous overcoating composition. When the amount is less than 1% by weight, the effects intended by the present invention cannot be attained. When the amount is more than 8% by weight, there are cases where the storage stability of the dispersion is decreased.

As specific examples of the (poly)alkylene glycol dialkyl ether represented by the general formula (I)

   (I)

(wherein $R_1$ and $R_2$ each are an alkyl group of 1 to 4 carbon atoms, $X_1$ is an oxyalkylene group of 2 to 4 carbon atoms and n is an integer of 1 to 4), there can be mentioned dialkyl ethers (e.g. dimethyl ether, diethyl ether, dipropyl ether, dibutyl ether, methyl ethyl ether, ethyl propyl ether, propyl butyl ether, methyl butyl ether, ethyl butyl ether, methyl propyl ether) of glycols (e.g. ethylene glycol, propylene glycol, trimethylene glycol, butylene glycol, diethylene glycol, dipropylene glycol, dibutylene glycol, triethylene glycol, tripropylene glycol, tributylene glycol, tetraethylene glycol, tetrapropylene glycol, tetrabutylene glycol). When $R_1$ and $R_2$ of the general formula (I) are each an alkyl group having 5 or more carbon atoms, the compatibility of the compound of the general formula (I) with the aqueous resin dispersion becomes insufficient and required homogeneous film setting cannot be obtained. Also when $X_1$ of the general formula (I) is an oxyalkylene group of 5 or more carbon atoms or when n is an integer of 5 or larger, the compatibility of the compound of the general formula (I) with the aqueous resin dispersion becomes insufficient and further the drying property or storage stability of an aqueous overcoating composition containing the compound of the general formula (I) becomes insufficient.

As specific examples of the alkylene glycol monoalkyl ether represented by the general formula (II)

   (II)

(wherein $R_3$ is an alkyl group of 4 to 11 carbon atoms and $X_2$ is an oxyalkylene group of 2 to 8 carbon atoms), there can be mentioned ethylene glycol monobutyl ether, ethylene glycol monopentyl ether, ethylene glycol monooctyl ether, ethylene glycol monononyl ether, ethylene glycol monolauryl ether, propylene glycol monobutyl ether, propylene glycol monohexyl ether, trimethylene glycol monobutyl ether, butylene glycol monobutyl ether, butylene glycol monooctyl ether, 1,3-pentylene glycol monobutyl ether, 2,2,4-trimethylpentylene glycol monobutyl ether, 2,2,4-trimethylpentylene glycol monocapryl ether, 2,2,4-trimethylpentylene glycol monolauryl ether, etc.

When $R_3$ of the general formula (II) is an alkyl group of 3 or less carbon atoms, striking improvement in ink setting as intended by the present invention cannot be attained. When $R_3$ is an alkyl group of 12 or more carbon atoms, the compatibility of the compound of the general formula (II) with the aqueous resin dispersion becomes insufficient. Also when $X_2$ of the general formula (II) is an oxyalkylene group of 9 or more carbon atoms, the compatibility of the compound of the general formula (II) with the aqueous resin dispersion becomes insufficient and further the storage stability of an aqueous overcoating composition containing the compound of the general formula (II) becomes insufficient.

As specific examples of the alkylene glycol monoester represented by the general formula (III)

$$R_4\text{—COO—}X_2\text{—H} \tag{III}$$

(wherein $R_4$ is an alkyl group of 3 to 11 carbon atoms and $X_2$ is an oxyalkylene group of 2 to 8 carbon atoms), there can be mentioned ethylene glycol monobutyrate, ethylene glycol monocaprylate, ethylene glycol monolaurate, propylene glycol monobutyrate, propylene glycol monocaprylate, propylene glycol monolaurate, trimethylene glycol monobutyrate, butylene glycol monocaproate, 1,3-pentylene glycol monobutyrate, 2,2,4-trimethylpentylene glycol 1-butyrate, 2,2,4-trimethylpentylene glycol monolaurate, etc.

When $R_4$ of the general formula (III) is an alkyl group of 2 or less carbon atoms, striking improvement in setting which is intended by the present invention cannot be obtained. When $R_4$ is an alkyl group of 12 or more carbon atoms, the compound of the general formula (III) is poor in homogeneous compatibility with the aqueous resin dispersion. When $X_2$ of the general formula (III) is an oxyalkylene group of 9 or more carbon atoms, there arise problems similar to those in the case of the compound of the general formula (II).

As specific examples of the alkylene glycol ether ester represented by the general formula (IV)

$$R_5\text{—COO—}X_2\text{—}R_6 \tag{IV}$$

(wherein $R_5$ and $R_6$ each are an alkyl group of 1 to 11 carbon atoms, however when $R_5$ is an alkyl group of 1 to 2 carbon atoms, $R_6$ cannot be an alkyl group of 1 to 3 carbon atoms, and $X_2$ is an oxyalkylene group of 2 to 8 carbon atoms), there can be mentioned ethylene glycol monobutyl ether acetate, ethylene glycol monohexyl ether acetate, ethylene glycol monolauryl ether acetate, ethylene glycol monoethyl ether butyrate, ethylene glycol monobutyl ether butyrate, propylene glycol monobutyl ether butyrate, propylene glycol monooctyl ether butyrate, ethylene glycol monoethyl ether caproate, ethylene glycol monooctyl ether caprylate, ethylene glycol monobutyl ether caprate, trimethylene glycol monooctyl ether acetate, 1,3-pentylene glycol monobutyl ether acetate, 2,2,4-trimethylpentylene glycol monopropyl ether butyrate, 2,2,4-trimethylpentylene glycol monlauryl ether acetate, etc.

When $R_5$ of the general formula (IV) is an alkyl group of 1 to 2 carbon atoms and at the same time $R_6$ is an alkyl group of 1 to 3 carbon atoms, effects as intended by the present invention cannot be attained. When $R_5$ and $R_6$ each are an alkyl group of 12 or more carbon atoms, the compound of the general formula (IV) has no sufficient compatibility with the aqueous resin dispersion. When $X_2$ of the general formula (IV) is an oxyalkylene group of 9 or more carbon atoms, there arise problems similar to those in the case of the compound of the general formula (II).

Incidentally, in conventional aqueous coating agents, there are added as necessary, for control of the drying property of the coating agents, water-miscible solvents such as monohydric alcohols (e.g. methyl alcohol, ethyl alcohol, isopropyl alcohol), polyhydric alcohols (e.g. ethylene glycol, propylene glycol, diethylene glycol glycerine), cellosolves (e.g. ethylene glycol monomethyl ether, ethylene glycol monoethyl ether), ethylene glycol monoethyl ether acetate, butyl carbitol and the like. These solvents have only a single effect of controlling the drying property of the coating agent and make no contribution at all to the setting and drying of an oil-based ink on which the coating agent is coated.

As specific examples of the dialkyl ester of a dicarboxylic acid represented by the general formula (V)

$$R_7\text{OOC—}X_3\text{—COOR}_8 \tag{V}$$

(wherein $R_7$ and $R_8$ each are an alkyl group of 1 to 8 carbon atoms and $X_3$ is a residue of an aliphatic or aromatic dicarboxylic acid), there can be mentioned dialkyl esters of dicarboxylic acids produced by esterification between 1 mol of (a) an aliphatic dicarboxylic acid (e.g. malonic acid, succinic acid, glutaric acid, adipic acid, pimelic acid, suberic acid, azelaic acid, sebacic acid, nonanedicarboxylic acid, decanedicarboxylic acid, maleic acid, itaconic acid, citraconic acid, mesaconic acid or the like) or an aromatic dicarboxylic acid (e.g. phthalic acid, isophthalic acid, terephthalic acid or the like) or an anhydride thereof and 2 mol of (b) a lower aliphatic alcohol of 1 to 8 carbon atoms (e.g. methyl alcohol, ethyl alcohol, n-propyl alcohol, isopropyl alcohol, n-butyl alcohol, sec-butyl alcohol, tert-butyl alcohol, heptyl alcohol, octyl alcohol, 2-ethylhexyl alcohol or the like).

When the compound of the general formula (V) is a dialkyl ester of an aliphatic dicarboxylic acid, an effective $X_3$ of the general formula (V) is an alkylene or alkenyl group of 1 to 10 carbon atoms. When $X_3$ has 11 or more carbon atoms, the compound of the general formula (V) has insufficient compatibility with the aqueous resin dispersion and accordingly cannot provide an aqueous overcoating composition having good storage-stability and moreover cannot enhance the homogeneous setting property of oil-based inks.

When the compound of the general formula (V) is a dialkyl ester of an aromatic dicarboxylic acid, it is preferred that the compound is a dialkyl ester of phthalic acid or its derivative.

$R_7$ and $R_8$ of the general formula (V) are required to be each an alkyl group of 1 to 8 carbon atoms. When they have 9 or more carbon atoms, the compound of the general formula (V) has insufficient compatibility with the aqueous resin dispersion and an aqueous overcoating composition produced therefrom has insufficient storage stability.

Dialkyl esters of dicarboxylic acids as mentioned above have conventionally been used as plasticizers in various coatings. As is already known by those skilled in the art, these esters used as plasticizers enhance various film properties of coating such as flexibility, rub resistance and adhesion strength.

However, it is impossible to predict from the above fact that the aqueous overcoating composition of the present invention containing a particular amount of a dialkyl ester of a dicarboxylic acid as mentioned above, when coated on an oil-based ink just printed on a sheet and still being in a wet state, greatly enhances the setting property of the ink.

In the following Comparative Examples, aqueous overcoating compositions containing a polyethylene glycol or polypropylene glycol (these glycols also are well-known plasticizers) instead of the above mentioned dialkyl ester of a dicarboxylic acid were tested. However, these compositions showed no contribution to the improvement of the setting or drying properties of oil-based ink.

The aqueous overcoating composition of the present invention comprised of (a) the above mentioned aqueous resin dispersion composed mainly of an acrylic copolymer and (b) the above mentioned particular compound(s) shows a striking effect on the setting or drying properties of an oil-based ink on which the composition is coated. Therefore, when the composition is coated on an oil-based ink just printed on a sheet, cutting, holding, etc. of the printed matter becomes possible right after coating of the composition and, hence, after-treatments for the printed matter which have hitherto been conducted several hours after printing can be done immediately after printing.

The aqueous overcoating composition of the present invention can enhance the setting property of an oil-based ink to a practically meaningful extent even if the composition contains none of the particular compounds of the general formulas (I) to (V) as long as the aqueous resin dispersion of the composition is a product of emulsion polymerization of a polymerizable monomer mixture containing 15 to 50% by weight of an acrylic acid ester and/or a methacrylic acid ester having 6–18 carbon atoms as the ester group.

To the aqueous overcoating composition of the present invention comprised mainly of (a) the above mentioned aqueous resin dispersion and (b) the above mentioned particular compound(s) may be added as necessary up to 15% by weight of a water-soluble varnish in order to improve the initial adhesion strength of the composition to an oil-based ink or to improve the film properties of the composition such as rub-resistance. As the water-soluble varnish, there can be used as aqueous solution of an alkali-soluble resin which has conventionally been used as a varnish for aqueous printing inks. As the aqueous solution of an alkali-soluble resin, there can be mentioned aqueous alkali solutions of acrylic resins, rosin-modified maleic resins, styrene/maleic resins, shellac resin, casein, etc. Addition of the water-soluble varnish in too large amount reduces the drying properties of the composition, lowers the film formation of an aqueous overcoating composition and impairs improvement in ink setting, which is an object of the present invention. Therefore, through attention must be given when a water-soluble varnish is used. Since the aqueous overcoating composition of the present invention should by itself possess drying properties for the prevention of offset and blocking, etc., it is preferable for the composition also to contain a water-miscible solvent of relatively low boiling point such as methyl alcohol, ethyl alcohol, propyl alcohol or the like. Such a solvent can be added in an amount of 1 to 10% by weight based on the aqueous overcoating composition in view of the drying properties of the aqueous overcoating composition. Other additives may also be added as necessary to the aqueous overcoating composition for purposes of viscosity adjustment, drying property adjustment, film properties (e.g. gloss and rub resistance) adjustment, levelling, etc. of the composition. These additives include an alcohol other than those mentioned above, a defoamant, a wax and a releasing agent.

The aqueous overcoating composition of the present invention can be coated on an oil-based ink just printed on a sheet and still being in a wet state, by the following methods.

In one coating method, a coating apparatus is arranged after the final printing unit of a printing press and, using this apparatus, an aqueous overcoating composition is coated on a surface just printed with an oil-based ink.

FIG. 1 shows the above case. In FIG. 1, 1 is a final printing unit; 2 is a coating apparatus; 3 is a drying apparatus and 8 is printed matter.

In FIG. 1, an ordinary roller coating apparatus is used, but other coatings such as spray coating, air knife coating, engraved roll coating and the like may be employed.

In another coating method, for example, in lithographic printing, an aqueous overcoating composition can be coated on a sheet just printed, by using a spare printing unit of a printing press and utilizing a dampening device of the press as a coating apparatus of said aqueous overcoating composition.

Figure 2:
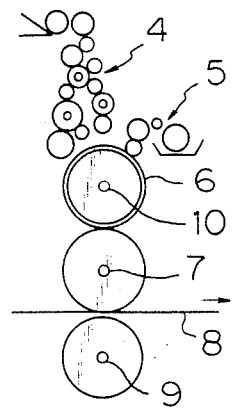
FIG. 2 shows another embodiment of the present invention wherein the final printing unit of a conventional printing press is utilized and an aqueous overcoating composition of the present invention is coated on printed matter in place of a dampening water with the inking device of the printing press detached from a printing plate.

FIG. 2 shows the above case wherein the final printing unit of a printing press is used for coating. With an inking device 4 detached from a printing plate, an aqueous overcoating composition is supplied by a dampening device 5 and coating of this composition is conducted at stages from a plate 6 (as necessary this plate is converted to a coating pattern) to a blanket 7.

Figure 3:
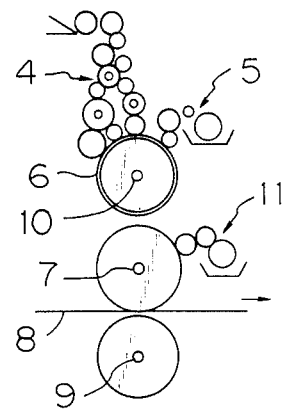
FIG. 3 is yet another embodiment of the present invention wherein the plate cylinder and the blanket of the final printing unit of a conventional printing press are separated from each other and an aqueous overcoating composition is supplied directly to the blanket.

In yet another coating method, as shown in FIG. 3, an aqueous overcoating composition can be coated on a sheet just printed by, in the final printing unit of a printing press, separating a blanket 7 from a plate cylinder 6 and supplying said composition directly to the blanket 7 by an apparatus specially arranged for this purpose.

In FIGS. 2 and 3, 5 is a dampening device 9, is an impression cylinder, 10 is a plate cylinder and 11 is a coating apparatus.

As described above, by various coating methods, the aqueous overcoating composition of the present invention can be coated on an oil-based ink just printed on a sheet and still being in a wet state, on a printing press or in a printing operation. This coating can be achieved by utilizing current printing press or by incorporating a simple coating apparatus into these printing press.

By coating the aqueous overcoating composition on the surface of an oil-based ink just printed and still being in a wet state and, if necessary, heating the composition for film formation, high speed printing and after-treatments right after printing become possible. This greatly enhances the efficiency of a printing operation and after-treatments operation.

Hereinunder, the present invention will be described more specifically by way of Examples. However, the present invention is in no way restricted by these Examples.

Reaction Example 1

Acrylic monomers shown in Table 1 were emulsion-polymerized in the amount ratios shown in Table 1 in accordance with an ordinary method to obtain aqueous resin dispersions 1 to 10.

In these polymerizations, there was used, as an emulsifier, an aqueous ammonia solution of an acrylic copolymer (Johncryl 67 manufactured by Johnson & Son Co.).

The non-volatile content of each aqueous resin dispersion was controlled at about 45%. The non-volatile content of the acrylic copolymer as an emulsifier in each aqueous resin dispersion was controlled at about 3%.

TABLE 1

| Vinyl monomer | Aqueous resin dispersion |  |  |  |  |  |  |  |  |  |
|---|---|---|---|---|---|---|---|---|---|---|
|  | 1 | 2 | 3 | 4 | 5 | 6 | 7 | 8 | 9 | 10 |
| styrene | 25 | 40 | 30 |  |  |  | 70 |  |  |  |
| Methyl acrylate |  |  |  |  | 50 |  |  |  |  |  |
| Ethyl acrylate |  |  |  |  |  | 50 |  |  |  | 88.5 |
| Butyl acrylate | 25 |  |  | 20 |  |  |  |  | 70 |  |
| Methyl methacrylate | 50 |  | 70 | 80 |  |  |  |  |  |  |
| Ethyl methacrylate |  |  |  |  |  |  |  |  |  |  |
| Butyl methacrylate |  | 60 |  |  |  | 50 | 23.1 | 92.3 | 23.1 |  |
| Hexyl methacrylate |  |  |  |  | 50 |  |  |  |  |  |
| Acrylic acid |  |  |  |  |  |  |  | 7.7 |  | 11.5 |
| Methacrylic acid |  |  |  |  |  | 6.9 |  |  | 6.9 |  |
| Tg (°C.) | 46° | 67° | 104° | 57° | −1° | 7° | 82° | 25° | −34° | −7 |
| Acid value | — | — | — | — | — | — | 45 | 60 | 45 | 90 |

Reaction Example 2

The aqueous resin dispersions 3 and 5 obtained in Reaction Example 1 were polymer-blended at ratios of 20:80 and 40:60, respectively, whereby aqueous resin dispersions 11 and 12 were obtained.

Reaction Example 3

Acrylic monomers shown in Table 2 were emulsion-polymerized in amount ratios shown in Table 1 in accordance with an ordinary method to obtain aqueous resin dispersions 13 to 26. In these polymerizations, the same emulsifier as used in Reaction Example 1 was used.

TABLE 2

| Monomer | Aqueous resin dispersion |  |  |  |  |  |  |  |  |  |  |  |  |  |
|---|---|---|---|---|---|---|---|---|---|---|---|---|---|---|
|  | 13 | 14 | 15 | 16 | 17 | 18 | 19 | 20 | 21 | 22 | 23 | 24 | 25 | 26 |
| n-Hexyl acrylate |  |  |  |  | 20 |  |  |  |  |  |  |  |  | 80 |
| 2-Ethylbutyl acrylate |  |  |  |  |  | 20 |  |  |  |  |  |  |  |  |
| Cyclohexyl acrylate |  |  |  |  |  |  | 20 |  | 15 |  |  |  |  |  |
| n-Octyl methacrylate |  | 30 |  |  |  |  |  |  |  | 15 |  |  |  |  |
| 2-Ethylhexyl methacrylate |  |  | 30 |  |  |  |  |  |  | 5 |  | 10 |  |  |
| Lauryl methacrylate |  |  |  | 20 |  |  |  | 20 |  |  |  |  | 60 |  |
| Stearyl methacrylate | 25 |  |  |  |  |  |  |  | 15 |  | 20 |  |  |  |
| Styrene | 25 |  |  | 60 | 60 | 60 | 40 | 30 |  |  |  | 20 |  |  |
| Methyl acrylate |  | 40 | 40 | 50 |  |  |  |  |  | 73.1 | 40 |  |  |  |
| Ethyl acrylate |  |  |  |  |  |  |  | 40 |  |  |  |  |  |  |
| Butyl acrylate |  |  | 30 | 20 | 20 | 20 |  |  |  | 20 |  | 20 |  |  |
| Methyl methacrylate |  |  |  |  |  |  |  |  |  |  |  |  |  | 20 |
| Ethyl methacrylate |  |  |  |  |  |  |  |  |  | 53.1 |  |  |  |  |
| Butyl methacrylate | 50 | 30 | 30 |  |  |  | 40 |  |  |  |  | 50 |  |  |
| Acrylic acid |  |  |  |  |  |  |  |  |  |  | 7.3 |  |  |  |
| Methacrylic acid |  |  |  |  |  |  |  |  |  | 6.9 |  |  |  |  |
| Tg (°C.) | −6 | 4 | 0 | −6 | 39 | 30 | 20 | 23 | −13 | 35 | −24 | 1 | −43 | −40 |
| Acid value | — | — | — | — | — | — | — | — | — | 45 | 60 | — | — | — |

TABLE 3

|  |  | Compound | Aqueous resin dispersion |
|---|---|---|---|
| Blending Example | 1 | Ethylene glycol dimethyl ether | 1 |
|  | 2 | Ethylene glycol diethyl ether | 2 |
|  | 3 | Ethylene glycol dibutyl ether | 3 |
|  | 4 | Ethylene glycol methyl butyl ether | 4 |
|  | 5 | Ethylene glycol ethyl butyl ether | 5 |
|  | 6 | Ethylene glycol dimethyl ether | 6 |
|  | 7 | Ethylene glycol diethyl ether | 7 |
|  | 8 | Ethylene glycol dibutyl ether | 8 |
|  | 9 | Ethylene glycol methyl butyl ether | 9 |
|  | 10 | Ethylene glycol ethyl butyl ether | 10 |
|  | 11 | Ethylene glycol dibutyl ether | 11 |
|  | 12 | Ethylene glycol dibutyl ether | 12 |
| Comparative Blending Example | 1 |  | 1 |
|  | 2 | Ethanol | 1 |
|  | 3 | Isopropyl alcohol | 1 |
|  | 4 | Ethylene glycol monomethyl ether | 1 |
|  | 5 | Ethylene glycol monoethyl ether | 1 |
|  | 6 | Ethylene glycol monoethyl ether acetate | 1 |
|  | 7 | Ethylene glycol | 1 |
|  | 8 | Diethylene glycol | 1 |
|  | 9 | Butyl carbitol | 1 |

Blending Examples 1 to 12
Comparative Blending Examples 1 to 9

In accordance with Table 3, 95% by weight of each of the aqueous resin dispersions 1 to 12 obtained in Reaction Examples 1 and 2 was mixed with 5% by weight of a compound represented by the general formula (I) of the present invention or with 5% by weight of a solvent ordinarily used in conventional aqueous dispersions, etc., whereby aqueous overcoating compositions of Blending Examples 1 to 12 and Comparative Blending Examples 1 to 9 were prepared.

Incidentally, Comparative Blending Example 1 is a case wherein the aqueous overcoating composition consists only of the aqueous resin dispersion 1.

Blending Examples 13 to 23

In accordance with Table 4, 92% by weight of each of aqueous resin dispersions 1, 2 and 4 to 12 obtained in Reaction Examples 1 and 2 was mixed with (a) 4% by weight of a compound of the general formula (I) of the present invention and (b) 4% by weight of ethyl alcohol as a drying accelerator, whereby aqueous overcoating compositions of Blending Examples 13 to 23 were prepared.

TABLE 4

| Blending Example | Compound | Aqueous resin dispersion |
|---|---|---|
| 13 | Propylene glycol diethyl ether | 1 |
| 14 | Propylene glycol ethyl butyl ether | 2 |
| 15 | Butylene glycol methyl ethyl ether | 4 |
| 16 | Butylene glycol diethyl ether | 5 |
| 17 | Diethylene glycol dibutyl ether | 6 |
| 18 | Triethylene glycol diethyl ether | 7 |
| 19 | Tetraethylene glycol dimethyl ether | 8 |
| 20 | Dipropylene glycol diethyl ether | 9 |
| 21 | Dibutylene glycol dimethyl ether | 10 |
| 22 | Tetrapropylene glycol diethyl ether | 11 |
| 23 | Tetrabutylene glycol diethyl ether | 12 |

Blending Example 24 to 42

In accordance with Table 5, 92% by weight of the aqueous resin dispersion 1 obtained in Reaction Example 1 was mixed with (a) 4% by weight of each of compounds of the general formulas (II) to (IV) of the present invention and (b) 4% by weight of ethyl alcohol, whereby aqueous overcoating compositions of Blending Examples 24 to 42 were prepared.

TABLE 5

| Blending Example | Compound | Aqueous resin dispersion |
|---|---|---|
| 24 | Ethylene glycol monobutyl ether | 1 |
| 25 | Ethylene glycol monobutyrate | 1 |
| 26 | Propylene glycol monobutyl ether | 1 |
| 27 | Trimethylene glycol monolaurate | 1 |
| 28 | Butylene glycol monobutyrate | 1 |
| 29 | 1,3-Pentylene glycol monobutyl ether | 1 |
| 30 | 1,3-Pentylene glycol monobutyrate | 1 |
| 31 | 2,2,4-Trimethylpentylene glycol monobutyl ether | 1 |
| 32 | 2,2,4-Trimethylpentylene glycol monobutyrate | 1 |
| 33 | Ethylene glycol monolauryl ether | 1 |
| 34 | Ethylene glycol monolaurate | 1 |
| 35 | Ethylene glycol monobutyl ether acetate | 1 |
| 36 | Propylene glycol monoethyl ether butyrate | 1 |
| 37 | Ethylene glycol monooctyl ether caprylate | 1 |
| 38 | Ethylene glycol monoethyl ether laurate | 1 |
| 39 | 1,3-Pentylene glycol monobutyl ether acetate | 1 |
| 40 | Propylene glycol monolauryl ether acetate | 1 |
| 41 | 2,2,4-Trimethylpentylene glycol monobutyl ether acetate | 1 |
| 42 | Ethylene glycol monopropyl ether | 1 |

TABLE 5-continued

| Blending Example | Compound | Aqueous resin dispersion |
|---|---|---|
| | caprylate | |

Blending Examples 43 to 53

Comparative Blending Examples 10 and 11

In accordance with Table 6, 92% by weight of each of aqueous resin dispersions 1, 2 and 4 to 12 was mixed with (a) 4% by weight of a dialkyl dicarboxylate of the general formula (V) of the present invention or a polyethylene glycol or a polypropylene glycol (these glycols are well-known plasticizers) and (b) 4% by weight of ethyl alcohol, whereby aqueous overcoating compositions of Blending Examples 43 to 53 and Comparative Blending Examples 10 and 11 were prepared.

TABLE 6

| | | Diester or glycol | Aqueous resin dispersion |
|---|---|---|---|
| Blending Example | 43 | Dioctyl malonate | 1 |
| | 44 | Dibutyl adipate | 2 |
| | 45 | Dibutyl azelate | 4 |
| | 46 | Diethyl sebacate | 5 |
| | 47 | Dibutyl sebacate | 6 |
| | 48 | Diethylhexyl sebacate | 7 |
| | 49 | Diethyl decanedicarboxylate | 8 |
| | 50 | Dibutyl itaconate | 9 |
| | 51 | Dibutyl maleate | 10 |
| | 52 | Dibutyl phthalate | 11 |
| | 53 | Dioxtyl phthalate | 12 |
| Comparative Blending Example | 10 | Polyethylene glycol (number average molecular weight: 600) | 1 |
| | 11 | Polypropylene glycol (number average molecular weight: 2,000) | 1 |

Coating Test 1

In order to evaluate the drying properties of the aqueous overcoating compositions of the present invention and their effects on setting of oil-based ink, the following coating test was conducted, wherein a paper having an aluminum foil layer was used to prevent infiltration into the paper of mineral oil, etc. in the ink.

Using R-I tester, an ordinary lithographic ink as an oil-based ink was printed on a paper with an aluminum foil layer. On the lithographic ink right after printing and still being in a wet state, there were coated aqueous overcoating compositions obtained in Blending Examples 1 to 11 and Comparative Blending Examples 1 to 9 by the use of a bar coater at an ambient temperature of 25° C. Then, the drying properties of these compositions and their effects on setting of the lithographic ink were examined. The results are shown in Table 7.

TABLE 7

| | Blending Example | | | | | | | | | | | Comparative Blending Example | | | | | | | |
|---|---|---|---|---|---|---|---|---|---|---|---|---|---|---|---|---|---|---|---|
| | 1 | 2 | 4 | 5 | 6 | 7 | 8 | 9 | 10 | 11 | 12 | 1 | 2 | 3 | 4 | 5 | 6 | 7 | 8 |
| Drying property of aqueous overcoating composition | O | O | O | O | O | O | O | O | O | O | O | Δ | O | O | Δ | Δ | Δ | X | X |
| Setting of lithographic ink | O | O | O | O | O | O | Δ | O | Δ | O | O | X | X | X | X | X | X | X | X |

The same Coating Test 1 was conducted for aqueous overcoating compositions obtained in Blending Examples 13 to 23. The results are shown in Table 8.

TABLE 8

| | Blending Example | | | | | | | | | | |
|---|---|---|---|---|---|---|---|---|---|---|---|
| | 13 | 14 | 15 | 16 | 17 | 18 | 19 | 20 | 21 | 22 | 23 |
| Drying property of aqueous overcoating composition | O | O | O | O | Δ | Δ | Δ | Δ | Δ | Δ | Δ |
| Setting of lithographic ink | O | O | O | O | O | O | Δ | O | Δ | O | O |

The Coating Test 1 was also conducted for aqueous overcoating compositions obtained in Blending Examples 24 to 42. Similar results were obtained. These aqueous overcoating compositions containing compounds of the general formulas (II) to (IV) showed a striking effect on the setting of oil-based ink as in the case of aqueous overcoating compositions containing compounds of the general formula (I).

The Coating Test 1 was also conducted for aqueous overcoating compositions obtained in Blending Examples 43 to 53 and Comparative Blending Examples 10 and 11. The results are shown in Table 9.

TABLE 9

| | Blending Example | | | | | | | | | | | Comparative Blending Example | |
|---|---|---|---|---|---|---|---|---|---|---|---|---|---|
| | 43 | 44 | 45 | 46 | 47 | 48 | 49 | 50 | 51 | 52 | 53 | 10 | 11 |
| Drying property of aqueous overcoating composition | O | O | O | O | O | O | O | O | O | O | O | Δ | Δ |
| Setting of lithographic ink | O | O | O | O | O | O | Δ | O | Δ | O | O | X | X |

Table 9 indicates that aqueous overcoating compositions containing glycols conventionally used as a plasticizer show not acceleration effect on the setting of oil-based ink.

Evaluation methods

1. Drying properties of aqueous overcoating composition

After coating of an aqueous overcoating composition, the surface of the coated composition was rubbed by the use of a rubber spatula to examine the time required for the composition to dry. When the composition took less than 20 sec. for drying, the composition was rated as O. A composition which took 20 sec. to 1 min. was rated as Δ. A composition which took over 1 min. was rated as X.

2. Setting of lithographic ink

After an aqueous overcoating composition had been coated, it was allowed to stand for 90 sec. Then, a cellophane adhesive tape was attached onto the composition. The setting of the lithographic ink was rated as follows based on the extent of tape peeling.

When a lithographic ink is in a set state, no cohesive failure occurs within the ink layer. Based on this fact, when the tape was pulled with reasonable peel-strength, if peeling occured between the tape and the aqueous overcoating composition or between the lithographic ink and the aluminum foil layer, the setting of the lithographic ink was regarded to be complete and rated as O. If the lithographic ink layer caused a cohesive failure but setting was completed within 5 min. after that, the setting of the lithographic ink was rated as Δ. If the lithographic ink layer caused a cohesive failure and did not completely set within 5 min, the setting of the lithographic ink was rated as X.

As is obvious from the above results, aqueous overcoating compositions containing compounds of the general formulas (I) to (V) of the present invention, when compared with aqueous overcoating compositions containing conventional solvents or plasticizers, show striking effects particularly in terms of the enhancement of the setting of oil-based ink. In contrast, aqueous overcoating compositions containing conventional water-miscible solvents or plasticizers show self-drying properties to some extent due to the evaporation characteristic of the solvent but have no effect at all on the setting of oil-based ink.

Blending Examples 54 to 59

Comparative Blending Example 12

In order to examine the effect of the addition amount of a solvent specified by the present invention on the performance of the aqueous overcoating composition of the present invention, 92% by weight of the aqueous resin dispersion 1 obtained in Reaction Example 1 was mixed with total 8% by weight of (a) a compound of the general formula (I) and (b) an conventional solvent or solvent mixture, whereby aqueous overcoating compositions of Blending Examples 54 to 59 and Comparative Blending Example 12 were prepared. Coating Test 1 was applied on these compositions. The results are shown in Table 10.

TABLE 10

| | Comparative Blending Example | Blending Example | | | | | |
|---|---|---|---|---|---|---|---|
| | 12 | 54 | 55 | 56 | 57 | 58 | 59 |
| Ethylene glycol dibutyl ether | 0.5 | 1 | 3 | 5 | 8 | 1 | 3 |
| Ethanol | 7.5 | 7 | 5 | 3 | 0 | 3 | 3 |
| Ethylene glycol | — | — | — | — | — | 4 | 3 |
| Drying property of aqueous overcoating composition | O | O | O | O | O | Δ | O |
| Setting of lithographic ink | X | Δ | O | O | O | Δ | O |

As is obvious from the above resutls, aqueous overcoating compositions contianing 1% by weight or more of the compound of the general formula (I) remarkably improved the setting of the lithographic ink used. An aqueous overcoating composition containing the above compound in an amount of more than 8% by weight is sufficiently effective for enhancement of setting but is insufficient in storage stability.

Blending Examples 60 to 73

In order to examine the effect of the type of the aqueous resin dispersion of the present invention on the performance of the aqueous overcoating composition of the present invention, 92% by weight of each of aqueous resin dispersions 13 to 26 obtained in Reaction Example 3 was mixed with 1% by weight of ethylene glycol dibutyl ether and 7% by weight of ethanol, whereby aqueous overcoating compositions of Blending Examples 60 to 73 were prepared, respectively.

The Coating Test 1 was applied for these compositions using the composition of Blending Example 54 for comparison.

The results are shown in Table 11.

TABLE 11

|  | Blending Example | | | | | | | | | | | | | | |
|---|---|---|---|---|---|---|---|---|---|---|---|---|---|---|---|
|  | 60 | 61 | 62 | 63 | 64 | 65 | 66 | 67 | 68 | 69 | 70 | 71 | 72 | 73 | 54 |
|  | | | | | | | Dispersion | | | | | | | | |
|  | 13 | 14 | 15 | 16 | 17 | 18 | 19 | 20 | 21 | 22 | 23 | 24 | 25 | 26 | 1 |
| Drying property of aqueous overcoating composition | O | O | O | O | O | O | O | O | O | O | Δ | O | Δ | Δ | O |
| Setting of lithographic ink | O | O | O | O | O | O | O | O | O | O | O | Δ | O | O | Δ |

As is obvious from Table 11, aqueous overcoating compositions using aqueous resin dispersions 13 to 23 and 25 and 26 showed striking effects on the acceleration of ink setting despite the fact that these compositions contained ethylene glycol dibutyl ether in an amount of only 1% by weight which is the lowest limit of the present invention. Blending Example 54 containing neither acrylate nor methacrylate having 6–18 carbon atoms as ester group, in the polymerizable monomer mixture and Blending Example 24 containing above esters as a polymerizable monomer component of aqueous dispersion in a small amount showed only an effect resulting from the addition of ethylene glycol dibutyl ether.

Blending Examples 74 to 83

These Examples are for comparison with Blending Examples 60 to 69. 96% by weight of each of aqueous resin dispersions 13 to 16 was mixed with 4% by weight of ethanol only (ethylene glycol dibutyl ether was not used), whereby aqueous overcoating compositions of Blending Examples 74 to 83 were prepared, respectively.

The results are shown in Table 12.

TABLE 12

|  | Blending Example | | | | | | | | | |
|---|---|---|---|---|---|---|---|---|---|---|
|  | 74 | 75 | 76 | 77 | 78 | 79 | 80 | 81 | 82 | 83 |
|  | | | | | Dispersion | | | | | |
|  | 13 | 14 | 15 | 16 | 17 | 18 | 19 | 20 | 21 | 22 |
| Drying property of aqueous overcoating composition | Δ | Δ | Δ | Δ | Δ | Δ | Δ | Δ | Δ | Δ |
| Setting of lithographic ink | O | O | O | O | O | O | O | O | O | O |

Blending Examples 84 to 86
Comparative Blending Example 13

In order to examine the effect of the addition of water-soluble varnish on the performance of an aqueous overcoating composition, an aqueous overcoating composition of the present invention (consisting of 95% by weight of the aqueous resin dispersion 1 and 5% by weight of ethylene glycol dibutyl ether) was mixed with a water-soluble vernish (an aqueous ammonia solution of an acrylic copolymer, Johncryl 67, resin content 30%) in various ratios, whereby aqueous overcoating compositions of Blending Examples 84 to 86 and Comparative Blending Example 13 were prepared. These compositions were subjected to the Coating Test 1. The results are shown in Table 13.

TABLE 13

|  | Blending Example | | | Comparative Blending Example |
|---|---|---|---|---|
|  | 84 | 85 | 86 | 13 |
| Aqueous overcoating composition | 95 | 90 | 85 | 80 |
| Aqueous solution type varnish | 5 | 10 | 15 | 20 |
| Drying property of aqueous overcoating composition | O | O | O | Δ |
| Setting of lithographic ink | O | O | Δ | X |

As is obvious from Table 13, when the amount of the water-soluble varnish added exceeded a certain level, ink setting was impeded. Therefore, the varnish amount is required to be 15% by weight or less.

Coating Test 2

In the same method and condition as used in Coating Test 1, aqueous overcoating compositions of Blending Examples 64 to 66 were coated on the same ink as used in Coating Test 1. Setting of the ink was examined every 10 sec. after coating in accordance with the cellophane adhesive tape test and the time required for complete setting was measured for each composition. The results are shown in Table 14.

TABLE 14

|  | Blending Example | | |
|---|---|---|---|
|  | 64 | 65 | 66 |
| Time to complete setting (sec.) | 110 | 90 | 70 |

As is obvious from Table 14, in aqueous overcoating compositions whose aqueous resin dispersions each contain a different acrylic acid ester of the same carbon atoms in the same amount, the ink setting of these compositions is best when the ester group of acrylic acid ester is an alicyclic hydrocarbon group and is better when the ester group is a branched aliphatic hydrocarbon group than when the ester group is a straight aliphatic hydrocarbon group.

Coating Test 3

As an example of conducting printing and coating in succession, a carton was printed with an ordinary lithographic ink by a sheet-fed 4 color lithographic printing press; an aqueous overcoating composition was coated on the printed carton; this coated carton was piled in 20 sheets and a load of 5 kg/cm² was applied; and after 1 hr., offset and blocking were rated. Also, the coated carton right after coating was cut at the printed portion by a cutter and scratch caused by the cutting was rated. The results are shown in Table 15.

The aqueous overcoating composition was supplied from a dampening apparatus at the final printing unit (4th color unit) and coated on the surface of the carbon already printed in 3 colors. The printing speed was 6,000 sheets/hr at 25° C. Aqueous overcoating compositions used were those of Blending Examples 1, 2, 8 and 11 and Comparative Blending Examples 1, 2, 4 and 7. When no composition was coated, an ordinary antiblocking agent (spray powder) was used in a standard amount.

TABLE 15

|  | Blending Example | | | | Comparative Blending Example | | | | No coating Composition used |
|---|---|---|---|---|---|---|---|---|---|
|  | 1 | 2 | 8 | 11 | 1 | 2 | 4 | 7 |  |
| Offset, blocking | No | No | No | No | Yes (2) | No | Yes (1) | Yes (1) | Yes (2) |
| Scratch | No | No | No | No | Yes | Yes | Yes | Yes | Yes |

(1) Blocking due to aqueous overcoating composition occured.
(2) Offset of ink occured.

Also, aqueous overcoating compositions of Blending Examples 13, 16, 18, 21, 24, 25, 29, 32, 35 and 39 were subjected to Coating Test 3. The results are shown in Table 16.

TABLE 16

|  | Blending Example | | | | | | | | | |
|---|---|---|---|---|---|---|---|---|---|---|
|  | 13 | 16 | 18 | 21 | 24 | 25 | 29 | 32 | 35 | 39 |
| Offset, blocking | No | No | No | No | No | No | No | No | No | No |
| Scratch | No | No | No | No | No | No | No | No | No | No |

Further, aqueous overcoating compositions of Blending Examples 43, 45, 47, 52, 62, 66, 69 and 73 were subjected to Coating Test 3. The results are shown in Table 17.

TABLE 17

|  | Blending Example | | | | | | | |
|---|---|---|---|---|---|---|---|---|
|  | 43 | 45 | 47 | 52 | 62 | 66 | 69 | 73 |
| Offset, blocking | No | No | No | No | No | No | No | No |
| Scratch | No | No | No | No | No | No | No | No |

As is obvious from all above results, aqueous overcoating compositions according to the present invention were excellent in drying properties in terms of composition and ink setting and therefore caused neither offset nor blocking. Further, printed matter coated with aqueous overcoating compositions of the present invention, caused no scratch due to insufficient setting of oil-based ink even when cut right after coating. Thus, the compositions of the present invention improved not only printing speed but also workability of after treatments. In contrast, in the compositions of the Comparative Blending Examples, scratch was shown only several hours after coating.

Coating Test 4

As an example of conducting printing, coating and heating in succession, printing was conducted with a low-temperature drying type heat-set ink by a web-fed lithographic printing press; each of the aqueous overcoating compositions of Blending Examples 1, 2, 3, 8, 11, 55 and 84 and Comparative Examples 1, 2, 4 and 7 was coated on the printed matter by the use of a gravure coater; and the coated matter was dried by means of a drier. The printing condition was 300 m/min at 25° C. Using a drier consisting of a burner and hot air, examination was carried out on the heating conditions of the drier in which there was no ink staining of the guide rollers transferred from printed web. Examination was also carried out on staining of a folding machine and offset and blocking resulting from binding after cutting. The results are shown in Table 18.

TABLE 18

|  | Blending Example | | | | | | | Comparative Blending Example | | | |
|---|---|---|---|---|---|---|---|---|---|---|---|
|  | 1 | 2 | 3 | 8 | 11 | 55 | 74 | 1 | 2 | 4 | 7 |
| Use of burner | No | No | No | No | No | No | No | No | No | Yes | Yes |
| Temperature of hot air (°C.) | 50 | 50 | 100 | 50 | R.T. (25) | R.T. (25) | 100 | 150 | 100 | 220 | 220 |
| Staining of folding machine | No | No | No | No | No | No | No | Yes | Yes | Yes | Yes |
| Offset and blocking after binding | No | No | No | No | No | No | No | Yes (2) | Yes (2) | Yes (1) | Yes (1) |

(1) Blocking due to aqueous overcoating composition occurred.
(2) Offset of ink occurred.

Also, aqueous overcoating compositions of Blending Examples 13, 16, 18, 21, 24, 25, 29, 32, 35, 39, 43, 45, 47, 48, 52, 62, 66, 69 and 73 were subjected to Coating Test 4. The results are shown in Table 19.

TABLE 19

|  | Blending Example | | | | | | | | | | | | | | | | | | |
|---|---|---|---|---|---|---|---|---|---|---|---|---|---|---|---|---|---|---|---|
|  | 13 | 16 | 18 | 21 | 24 | 25 | 29 | 32 | 35 | 39 | 43 | 45 | 47 | 48 | 52 | 62 | 66 | 69 | 73 |
| Use of burner | No | No | No | No | No | No | No | No | No | No | No | No | No | No | No | No | No | No | No |
| Temperature of hot air (°C.) | R.T. (25) | R.T. (25) | 100 | 50 | R.T. (25) | 50 | 50 | 50 | 100 | 100 | 100 | 100 | 100 | 100 | 100 | 100 | 100 | 100 | 100 |
| Staining of folding machine | No | No | No | No | No | No | No | No | No | No | No | No | No | No | No | No | No | No | No |
| Offset and | No | No | No | No | No | No | No | No | No | No | No | No | No | No | No | No | No | No | No |

TABLE 19-continued

| | Blending Example | | | | | | | | | | | | | | | | | |
|---|---|---|---|---|---|---|---|---|---|---|---|---|---|---|---|---|---|---|
| | 13 | 16 | 18 | 21 | 24 | 25 | 29 | 32 | 35 | 39 | 43 | 45 | 47 | 48 | 52 | 62 | 66 | 69 | 73 |
| blocking after binding | | | | | | | | | | | | | | | | | | | |

As is obvious from the above results, use of an aqueous overcoating composition of the present invention makes it possible to substantially reduce the drier temperature of a web-fed lithographic printer. Moreover, in the above tests, aqueous overcoating compositions of the present invention caused no staining of a folding machine due to belt, etc. and no offset or blocking after binding.

What is claimed is:

1. A printing method which comprises coating an aqueous overcoating composition on a wet surface just printed with an oil-based ink in a thin film, so as to greatly accelerate the setting and drying of said oil based ink, said composition comprising:

(a) an aqueous dispersion of a resin composed of an acrylic copolymer having an acid value of 50 or less which is obtained by emulsion-polymerizing a polymerizable monomer mixture comprising at least one of acrylic acid esters and methacrylic acid esters both represented by the formula:

$$CH_2=C-COOR_{10}$$
$$\quad\quad |$$
$$\quad\quad R_9$$

wherein $R_9$ is a hydrogen atom or a methyl group and $R_{10}$ is a straight or branched aliphatic hydrocarbon group of 1 to 18 carbon atoms or an alicyclic hydrocarbon group, and (b) 1 to 8% by weight, based on said composition, of at least one compound selected from the group consisting of:

(A) a (poly)alkylene glycol dialkyl ether represented by the formula (I)

$$R_1-O-(X_1)n-R_2 \quad\quad (I)$$

wherein $R_1$ and $R_2$ each are an alkyl group of 1 to 4 carbon atoms, $X_1$ is an oxyalkylene group of 2 to 4 carbon atoms and n is an integer of 1 to 4, (B) an alkylene glycol monoalkyl ether represented by the formula (II)

$$R_3-O-X_2-H \quad\quad (II)$$

wherein $R_3$ is an alkyl group of 4 to 12 carbon atoms and $X_2$ is an oxyalkylene group of 2 to 8 carbon atoms, (C) an alkylene glycol monoester represented by the formula (III)

$$R_4-COO-X_2-H \quad\quad (III)$$

wherein $R_4$ is an alkyl group of 3 to 11 carbon atoms and $X_2$ has the same definition as given above, (D) an alkylene glycol ether ester represented by the formula (IV)

$$R_5-COO-X_2-R_6 \quad\quad (IV)$$

wherein $R_5$ is an alkyl group of 1 to 11 carbon atoms, and $R_6$ is an alkyl group of 1 to 12 carbon atoms but when $R_5$ is an alkyl group of 1 to 2 carbon atoms, $R_6$ shall not be an alkyl group of 1 to 3 carbon atoms, wherein $X_2$ has the same definition as given above, and (E) a dialkyl ester of a dicarboxylic acid represented by the formula (V)

$$R_7OOC-X_3-COOR_8 \quad\quad (V)$$

wherein $R_7$ and $R_8$ each are an alkyl group of 1 to 8 carbon atoms and $X_3$ is an alkylene or alkenylene group of 1 to 10 carbon atoms, and being capable of forming a film at the ambient temperature of a printing operation.

2. The printing method as claimed in claim 1, in which said composition is capable of forming a film at any temperature from ambient temperature to 80° C.

3. The printing method as claimed in claim 1, in which the esters have, as $R_{10}$ of the formula, a straight or branched aliphatic hydrocarbon group of 6 to 18 carbon atoms or an alicyclic hydrocarbon group of 6 to 18 carbon atoms.

4. The printing method as claimed in claim 1, in which the polymerizable monomer mixture also comprises at least one compound selected from the group consisting of (b) styrene compounds and (c) acrylic acid or methacrylic acid.

5. The printing method as claimed in claim 1, in which the polymerizable monomer mixture contains 15% by weight or more based on total polymerizable monomers of the acrylic acid ester and methacrylic acid ester.

6. The printing method as claimed in claim 5, in which the polymerizable monomer mixture contains 20 to 50% by weight of the acrylic acid ester and methacrylic acid ester.

7. The printing method as claimed in claim 1, in which said composition comprises 3 to 5% by weight of at least one compound selected from the compounds represented by (A) to (E).

8. The printing method as claimed in claim 1, in which the aqueous overcoating composition is coated by a coating apparatus arranged to follow the final printing unit of a printer.

9. The printing method as claimed in claim 1, in which the aqueous overcoating composition is coated by the utilization of a dampening water feeder of the final printing unit of a lithographic printer.

10. The printing method as claimed in claim 1, in which the aqueous overcoating composition is coated by an apparatus arranged such as to feed the aqueous overcoating composition to a blanket of the final printing unit of a lithographic printer.

* * * * *